United States Patent
Ha et al.

(10) Patent No.: US 7,106,390 B2
(45) Date of Patent: Sep. 12, 2006

(54) LIQUID CRYSTAL DISPLAY AND FABRICATING METHOD THEREOF

(75) Inventors: Young Hun Ha, Kumi-shi (KR); Jae Moon Soh, Kumi-shi (KR); Jong Woo Kim, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/026,961

(22) Filed: Dec. 27, 2001

(65) Prior Publication Data

US 2002/0093599 A1  Jul. 18, 2002

(30) Foreign Application Priority Data

Dec. 29, 2000  (KR) .............................. P2000-85363

(51) Int. Cl.
*G02F 1/1343* (2006.01)
(52) U.S. Cl. .............................. 349/38; 349/43; 257/59
(58) Field of Classification Search .................. 257/59, 257/72; 349/38, 43, 42, 138, 46
See application file for complete search history.

(56) References Cited

U.S. PATENT DOCUMENTS

| | | | | |
|---|---|---|---|---|
| 5,926,235 A | * | 7/1999 | Han et al. ..................... | 349/43 |
| 5,982,467 A | * | 11/1999 | Lee ............................. | 349/138 |
| 6,091,466 A | * | 7/2000 | Kim et al. .................... | 349/43 |
| 6,262,784 B1 | * | 7/2001 | Kim ............................ | 349/43 |

* cited by examiner

*Primary Examiner*—Kenneth Parker
*Assistant Examiner*—Matthew C. Landau
(74) *Attorney, Agent, or Firm*—McKenna Long & Aldridge LLP

(57) ABSTRACT

A liquid crystal display device and a fabricating method thereof that are capable of preventing breakage of a pixel electrode. In the device, the protective layer pattern is provided at the overlapping area between the storage electrode and the pixel electrode to separate the storage electrode and the pixel electrode. Accordingly, the protective layer pattern is formed at the storage capacitor area to improve step coverage of a transparent conductive material.

17 Claims, 17 Drawing Sheets

LIQUID CRYSTAL DISPLAY AND FABRICATING METHOD THEREOF

This application claims the benefit of Korean Patent Application No. 2000-85363 filed on Dec. 29, 2000, which is hereby incorporated by reference as if fully set forth herein.

BACKGROUND OF THE INVENTION

1. Field of the Invention

This invention relates to a liquid crystal display, and more particularly to a liquid crystal display and a fabricating method thereof that are capable of preventing a breakage of a pixel electrode.

2. Discussion of the Related Art

Generally, a liquid crystal display (LCD) of active matrix driving system uses thin film transistors (TFT's) as switching devices to display a natural moving picture. Since such an LCD can be made into a smaller device in size than a CRT, it has been widely used as a monitor for a personal computer or a notebook computer, as well as in office automation equipment such as a copy machines, etc. and a portable equipment such as a cellular phone and a pager, etc.

Referring to FIG. 1 and FIG. 2, a lower substrate 1 of an LCD includes a thin film transistor (TFT) T arranged at crossing area of a data line 4 and a gate line 2, a pixel electrode 22 connected to a drain electrode 10 of the TFT, and a storage capacitor S positioned at an overlapping portion between the pixel electrode 22 and the previous gate line 2. FIG. 2 is a cross-sectional view taken along I–I' of FIG. 1.

The TFT T includes a gate electrode 6 connected to the gate line 2, a source electrode 8 connected to the data line 4, and a drain electrode 10 connected, via a first contact hole 20a, to the pixel electrode 22. Further, the TFT T includes semiconductor layers 14 and 16 for defining a channel between the source electrode 8 and the drain electrode 10 by a gate voltage applied to the gate electrode 6. Such a TFT T responds to a gate signal from the gate line 2 to selectively apply a data signal from the data line 4 to the pixel electrode 22.

The pixel electrode 22 is positioned at a cell area defined by the data line 4 and the gate line 2 and is made from a transparent conductive material having a high light transmissivity. The pixel electrode 22 generates a poterntial difference from a common transparent electrode (not shown) provided at an upper substrate (not shown) from a data signal applied via the first contact hole 20a. By this potential difference, a liquid crystal positioned between the lower substrate 1 and the upper substrate (not shown) is rotated due to its dielectric anisotropy. Thus, the liquid crystal allows light applied from a light source to be transmitted into the upper substrate via the pixel electrode 22.

The storage capacitor S charges a voltage as a gate high voltage is applied to the previous gate line 2 and discharges the charged voltage as a data signal is applied to the pixel electrode to prevent a voltage variation in the pixel electrode 22. The storage capacitor S consists of a previous gate line 2 and a storage electrode 30 overlapping with the gate line 2 with a gate insulating film 12 therebetween. The storage capacitor S is electrically connected to the pixel electrode 22 via a second contact hole 20b defined at a protective film 18.

Such a lower substrate 1 of the LCD requires at least five masks for patterning each layer.

The gate electrode 6 is patterned with a first mask while the semiconductor layers 14 and 16 are patterned with a second mask. The storage electrode 30 and the source and drain electrodes 8 and 10 are patterned with a third mask while the first contact hole 20a, the second contact hole 20b and the protective layer 18 are patterned with a fourth mask. The pixel electrode 22 is patterned with a fifth mask.

FIG. 3A to FIG. 3E are sectional views for explaining a method of fabricating the LCD device shown in FIG. 2 step by step.

Referring first to FIG. 3A, the gate electrode 6 and the gate line 2 are provided on the substrate 1. The gate electrode 6 and the gate line 2 are formed by depositing aluminum (Al) or copper (Cu), etc. using a deposition technique such as a sputtering, etc. and then patterning it with the first mask.

Referring to FIG. 3B, an active layer 14 and an ohmic contact layer 16 are provided on a gate insulating film 12.

The active layer 14 and the ohmic contact layer 16 are formed by disposing the semiconductor layers 14 and 16 after forming the gate insulating film 12 on the substrate 1 in such a manner to cover the gate electrode 6 and then patterning them with the second mask.

The gate insulating film 12 is formed by depositing an insulating material such as silicon nitride ($SiN_x$) or silicon oxide ($SiO_x$) by the plasma enhanced chemical vapor deposition (PECVD) technique. The active layer 14 is formed from amorphous silicon that is not doped with an impurity. On the other hand, the ohmic contact layer 16 is formed from amorphous silicon doped with an n-type or p-type impurity at a high concentration.

Referring to FIG. 3C, the storage electrode 30 and the source and drain electrodes 8 and 10 are provided on the gate insulating film 12. The storage electrode 30 and the source and drain electrodes 8 and 10 are formed by entirely depositing a metal layer using the chemical vapor deposition (CVD) technique or the sputtering technique and then patterning it with the third mask. After the source and drain electrodes 8 and 10 are patterned, the ohmic contact layer 16 at an area corresponding to the gate electrode 6 also is patterned to expose the active layer 14. The area of the active layer 14 corresponding to the gate electrode 6 between the source and drain electrodes 8 and 10 makes a channel. The storage electrode 30 and the source and drain electrodes 8 and 10 are made from chrome (Cr) or molybdenum (Mo).

Referring to FIG. 3D, the protective layer 18 and the first and second contact holes 20a, 20b are provided on the gate insulating layer 12. The protective layer 18 and the first and second contact holes 20a, 20b are formed by depositing an insulating material on the gate insulating layer 12 in such a manner to cover the storage electrode 30 and the source and drain electrodes 8 and 10 and then patterning it with the fourth mask. The protective layer 18 is made from an inorganic insulating material such as silicon nitride ($SiN_x$) or silicon oxide ($SiO_x$), an acrylic organic compound, or an organic insulating material having a small dielectric constant such as Teflon, BCB (benzocyclobutene), Cytop or PFCB (perfluorocyclobutane).

Referring to FIG. 3E. the pixel electrode 22 is provided on the protective layer 18. The pixel electrode 22 is formed by depositing a transparent conductive material on the protective layer 18 and then patterning it with the fifth mask. The pixel electrode 22 is electrically connected to the drain electrode 10 via the first contact hole 20a and is electrically connected to the storage electrode 30 via the second contact hole 20b. The pixel electrode 22 is made from a transparent conductive material such as indium-tin-oxide (ITO), indium-zinc-oxide (IZO) or indium-tin-zinc-oxide (ITZO).

Although such a lower substrate of the liquid crystal display device requires a five-step mask process, it additionally requires at least two masks for the purpose of preventing a hillock that may occur at an aluminum surface when the gate electrode is made from aluminum. Accordingly, a construction of the lower substrate of the liquid crystal display device requires at least a five- to seven-step mask process.

As the number of masks increases, the number of processes and processing time not only increase when each layer is patterned, but also the productivity and the yield are reduced. For this reason, there has been actively conducted a study for reducing the number of masks.

FIG. 4 and FIG. 5 are a plan view and a sectional view, respectively, showing a lower substrate of the LCD employing a half-tone mask in a four-mask process.

Referring to FIG. 4 and FIG. 5, the lower substrate 1 of the LCD includes a thin film transistor (TFT) T arranged at a crossing area of a data line 4 and a gate line 2, a pixel electrode 22 connected to a drain electrode 10 of the TFT T, and a storage capacitor S positioned at an overlapping portion between the pixel electrode 22 and the previous gate line 2.

The TFT T includes a gate electrode 6 connected to the gate line 2, a source electrode 8 connected to the data line 4 and a drain electrode 10 connected to the pixel electrode 22 via a contact hole 20. Further, the TFT T includes semiconductor layers 14 and 16 for defining a channel between the source electrode 8 and the drain electrode 10 by a gate voltage applied to the gate electrode 6. Such a TFT T responds to a gate signal from the gate line 2 to selectively apply a data signal from the data line 4 to the pixel electrode 22.

The pixel electrode 22 is positioned at a cell area defined by the data line 4 and the gate line 2 and is made from a transparent conductive material having a high light transmissivity. The pixel electrode 22 generates a potential difference from a common transparent electrode (not shown) provided at an upper substrate (not shown) from a data signal applied via the contact hole 20. By this potential difference, a liquid crystal positioned between the lower substrate 1 and the upper substrate (not shown) is rotated due to its dielectric anisotropy. Thus, the liquid crystal allows a light applied from a light source to be transmitted into the upper substrate via the pixel electrode 22.

The storage capacitor S charges a voltage as a gate high voltage is applied to the previous gate line 2, and discharges the charged voltage as a data signal is applied to the pixel electrode to prevent a voltage variation in the pixel electrode 22. The storage capacitor S consists of a previous gate line 2 and a storage electrode 30 overlapping with the gate line 2 with a gate insulating film 12 therebetween. The storage capacitor S is directly connected to the pixel electrode 22.

Such a lower substrate 1 of the LCD requires at least four masks for patterning each layer. The gate electrode 6 is patterned with a first mask, while an ohmic contact layer 16, the storage electrode 30 and the source and drain electrodes 8 and 10 are patterned with a second mask. The active layer 14, the contact hole 20 and the protective layer 18 are patterned with a third mask, while the pixel electrode 22 is patterned with a fourth mask.

Referring first to FIG. 6A, the gate line 2 and the gate electrode 6 are provided on the substrate 1. The gate line 2 and the gate electrode 6 are formed by depositing aluminum (Al) or copper (Cu) using a deposition technique such as a sputtering, etc. and then patterning it with the first mask.

Referring to FIG. 6B, the gate insulating film 12, the ohmic contact layer 16, the storage electrode 30 and the source and drain electrodes 8 and 10 are provided on the substrate 1. The gate insulating film 12 is formed by entirely depositing on the substrate 1 in such a manner to cover the gate electrode 6 and the gate line 2.

The ohmic contact layer 16, the storage electrode 30 and the source and drain electrodes 8 and 10 are formed by depositing a first semiconductor layer 14a, a second semiconductor layer and a metal layer on the gate insulating film 12 and then patterning the second semiconductor layer and the metal layer using the second mask. After the storage electrode 30 and the source and drain electrodes 8 and 10 are patterned, the ohmic contact layer 16 at an area corresponding to the gate electrode 6 also is patterned to expose the first semiconductor layer 14a. The area corresponding to the gate electrode 6 between the source and drain electrodes 8 and 10 at the first semiconductor layer 14a makes a channel.

The gate insulating film 12 is formed by depositing an insulating material such as silicon nitride ($SiN_x$) or silicon oxide ($SiO_x$) by the plasma enhanced chemical vapor deposition (PECVD). The first semiconductor layer 14a, which is formed to be an active layer later, is formed from amorphous silicon that is not doped with an impurity. On the other hand, the ohmic contact layer 16 is formed from amorphous silicon doped with an n-type or p-type impurity at a high concentration. The storage electrode 30 and the source and drain electrodes 8 and 10 are formed from chrome (Cr) or molybdenum (Mo).

Referring to FIG. 6C, an insulating material 18a and a photoresist 24 are provided on the first semiconductor layer 14a. A half-tone mask 26 that is the third mask having a transmissive part 26a, a semi-transmissive part 26b and a shielding part 26c is positioned over the photoresist 24. The shielding part 26c is defined at an area later to be provided with the protective film 18 of the TFT; the transmissive part 26a is defined at an area later to be provided with the contact hole 20 of the TFT; and the semi-transmissive part 26b is defined at the remaining area.

The half-tone mask 26 selectively irradiates ultraviolet light to the photoresist 24 to expose it to the light.

The insulating material 18a is made from an inorganic insulating material such as silicon nitride ($SiN_x$) or silicon oxide ($SiO_x$), an acrylic organic compound, or an organic insulating material having a small dielectric constant such as Teflon, BCB (benzocyclobutene), Cytop or PFCB (perfluorocyclobutane).

Referring to FIG. 6D, a photoresist pattern 28 is formed on the insulating material 18a. The photoresist pattern 28 is formed by developing the photoresist 24 with a developer such as alkali aqueous solution. The photoresist pattern 28 having a thickness corresponding to approximately 10 to 50% of the initial coating thickness is formed at an area corresponding to the semi-transmissive part 26b of the half-tone mask 26. The photoresist pattern 28 having the initial coating thickness is formed at an area corresponding to the shielding part 26c. The photoresist pattern 28 is removed at an area corresponding to the transmissive part 26a to thereby expose the insulating material 18a.

Referring to FIG. 6E, the active layer 14, the protective layer 18 and the contact hole 20 are provided on the gate insulating layer 12. The active layer 14, the protective layer 18 and the contact hole 20 are formed by exposing the lower substrate 1 provided with the photoresist pattern 28 to an etchant to simultaneously etch the insulating material 18a and the first semiconductor layer 14a. After the active layer 14, the protective layer 18 and the contact hole 20 are formed, the photoresist pattern 28 is removed.

Referring to FIG. 6F, the pixel electrode 22 is provided on the protective layer 18. The pixel electrode 22 is formed by depositing a transparent conductive material such as indium-tin-oxide (ITO), indium-zinc-oxide (IZO) or indium-tin-zinc-oxide (ITZO) on the protective layer 18 and then patterning it using the fourth mask. The pixel electrode 22 is electrically connected to the drain electrode 10 via the contact hole 20, and is directly connected to the storage electrode 30 with no contact hole.

On the storage capacitor area S of the LCD, as shown in FIG. 6D, the photoresist pattern 28 is remained about 10 to 50 percents. After the contact hole 20 is formed, the area of the photoresist pattern 28 corresponding to the semi-transmissive part 26b of the half-tone mask 26 is removed by an ashing process. After all, the photoresist pattern 28 for forming the protective layer 18 and the active layer 14 are not provided on the storage capacitor area S. In other words, if the storage capacitor area S at the lower substrate 1 of the LCD is exposed to an etchant, then the protective layer 18 is entirely removed by the dry etching while the active layer 14 is left only at the lower portion of the storage electrode 30 formed by the wet etching. Since an eddy phenomenon is generated at the side surface of the active layer 14 when the active layer 14 is etched, the active layer 14 under the edge of the storage electrode 30 is more undercut than the storage electrode 30 to form a step coverage or an overhang, as shown in FIG. 7. If a transparent conductive material is deposited onto the gate insulating film 12 on which the active layer 14 is formed in the step coverage, the transparent conductive material is non-uniformly deposited at the step coverage area. For this reason, the conventional LCD has a problem in that, when the lower substrate 1 of the LCD is dipped into an etchant to etch the transparent conductive material, the pixel electrode 22 is susceptible to breakage at the step coverage area.

SUMMARY OF THE INVENTION

Accordingly, the present invention is directed to Liquid Crystal Display Fabrication Method Thereof that substantially obviates one or more of the problems due to limitations and disadvantages of the related art.

Accordingly, it is an advantage of the present invention to provide a liquid crystal display and a fabricating method thereof that is capable of preventing breakage of a pixel electrode.

In order to achieve these and other advantages of the invention, a liquid crystal display device according to one aspect of the present invention includes a data line supplied with a data signal, a gate line supplied with a scanning signal, a pixel electrode for driving a liquid crystal cell, and a thin film transistor for responding to the scanning signal to switch the data signal into the pixel electrode, a storage electrode overlapping with the gate line and constituting a storage capacitor, and a protective layer pattern being formed separately between the storage electrode and the pixel electrode at an overlapping area between the storage electrode and the pixel electrode.

In the liquid crystal display device, the storage capacitor area includes a gate insulating film formed on a substrate in such a manner to cover the gate line; and a semiconductor layer between the gate insulating film and the storage electrode.

In the liquid crystal display device, the protective layer is separately formed at each edge of both lower sides of the storage capacitor area.

The liquid crystal display device, further includes a gate electrode formed to connect with the gate line on the substrate; a gate insulating film formed on the substrate; a semiconductor layer formed on the gate insulating film; a source electrode and a drain electrode formed on the gate insulating film; and a protective layer formed between the gate insulating film and the pixel electrode.

In the liquid crystal display device, the semiconductor layer is formed with an active layer and an ohmic contact layer, and the active layer is formed in the same pattern as the protective layer and the ohmic contact layer is formed in the same pattern as the source electrode and the drain electrode.

A liquid crystal display device according to another aspect of the present invention includes a data line supplied with a data signal, a gate line supplied with a scanning signal, a pixel electrode for driving a liquid crystal cell, and a thin film transistor for responding to the scanning signal to switch the data signal into the pixel electrode, a storage electrode overlapping with the gate line and constituting a storage capacitor, and a pixel electrode extended into each side edge and the upper edge of the storage electrode.

In the liquid crystal display device, the storage capacitor area includes the gate line provided on a substrate; a gate insulating film formed on the substrate in order to cover the gate line; and a semiconductor layer formed on the gate insulating film in the same pattern as the storage electrode simultaneously.

The liquid crystal display device, further includes a gate electrode formed to connect with the gate line on the substrate; a gate insulating film formed on the substrate; a semiconductor layer formed on the gate insulating film; a source electrode and a drain electrode formed on the gate insulating film; a protective layer formed on the gate insulating film; and the pixel electrode formed on the protective layer.

In the liquid crystal display device, the semiconductor layer is formed with an active layer and an ohmic contact layer, and the active layer is formed in the same pattern as the protective layer and the ohmic contact layer is formed in the same pattern as the source electrode and the drain electrode.

A method of fabricating a liquid crystal display device according to still another aspect of the present invention includes forming a gate line on a substrate; forming a gate insulating film on the substrate in such a manner to cover the gate line; forming an ohmic contact layer and a storage electrode by entirely depositing a first semiconductor layer, a second semiconductor layer and a metal layer onto the gate insulating film and then simultaneously patterning the second semiconductor layer and the metal layer into the same pattern; forming an active layer and a protective layer by depositing an insulating material onto the first semiconductor layer and then patterning the first semiconductor layer and the insulating material; and forming a pixel electrode by depositing a transparent conductive material onto the gate insulating film and then patterning it.

In the method, the protective layer is separately formed at each lower edge of the storage capacitor area.

The method further includes forming a gate electrode on the substrate; forming a gate insulating film on the substrate on which the gate electrode is formed; forming an ohmic contact layer and source and drain electrodes on the gate insulating film in the same pattern simultaneously; forming an active layer and a protective layer on the gate insulating film in the same pattern simultaneously; and forming a pixel electrode on the protective layer.

A method of fabricating a liquid crystal display device according to still another aspect of the present invention includes forming a gate line on a substrate; forming a gate insulating film on the substrate in such a manner to cover the gate line; forming an ohmic contact layer and a storage electrode by entirely depositing a first semiconductor layer, a second semiconductor layer and a metal layer onto the gate insulating film and then simultaneously patterning the second semiconductor layer and the metal layer into the same pattern; forming an active layer by depositing an insulating material onto the first semiconductor layer and then simultaneously patterning the first semiconductor layer and the insulating material; and forming a pixel electrode by depositing a transparent conductive material onto the gate insulating film at an area extended into each side edge and the upper edge of the storage electrode and then patterning it.

The method further includes forming a gate electrode on the substrate; forming a gate insulating film on the substrate in such a manner to cover the gate electrode; forming an ohmic contact layer and source and drain electrodes on the gate insulating film in the same pattern simultaneously; forming an active layer and a protective layer on the gate insulating film in the same pattern simultaneously; and forming a pixel electrode on the gate insulating film.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

These and other advantages of the invention will be apparent from the following detailed description of the embodiments of the present invention with reference to the accompanying drawings, in which, in the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
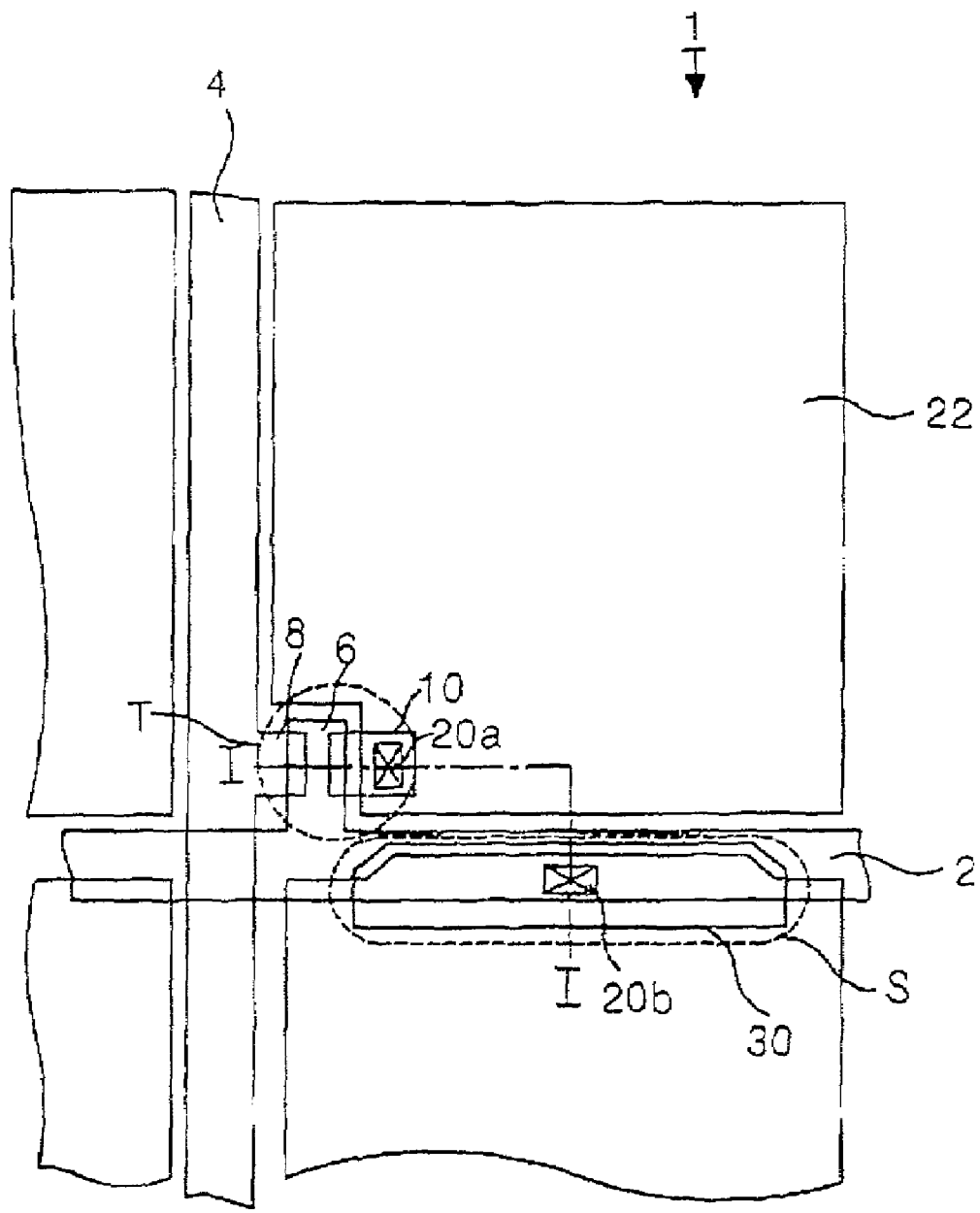
FIG. 1 is a plan view showing a structure of a conventional liquid crystal display device formed with five masks.
Figure 2:
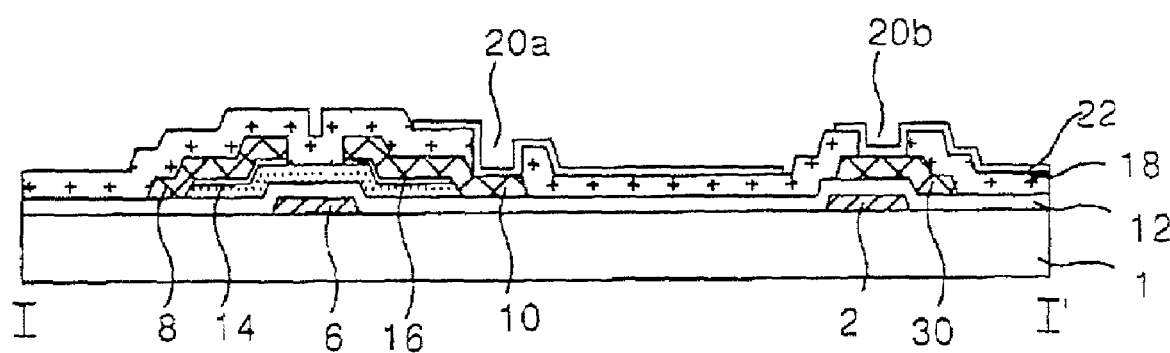
FIG. 2 is a section view of the liquid crystal display device taken along the I-I' line in FIG. 1.
Figure 3A:
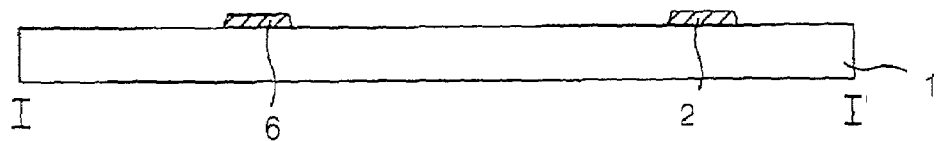
FIG. 3A to FIG. 3E are section views representing step by step a method of fabricating the liquid crystal display device shown in FIG. 2.
Figure 3B:
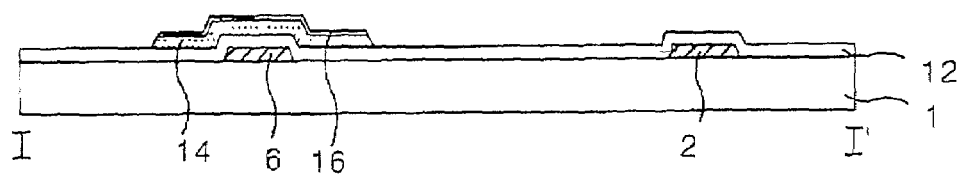
Figure 3C:
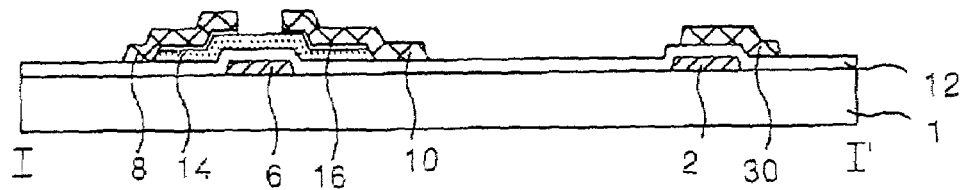
Figure 3D:
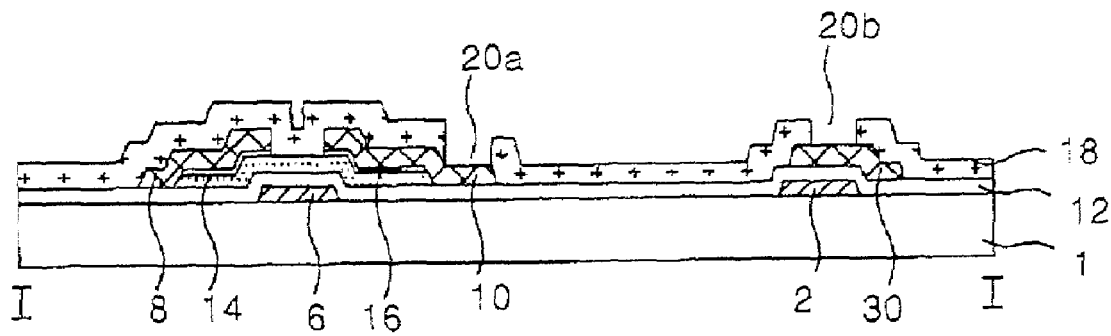
Figure 3E:
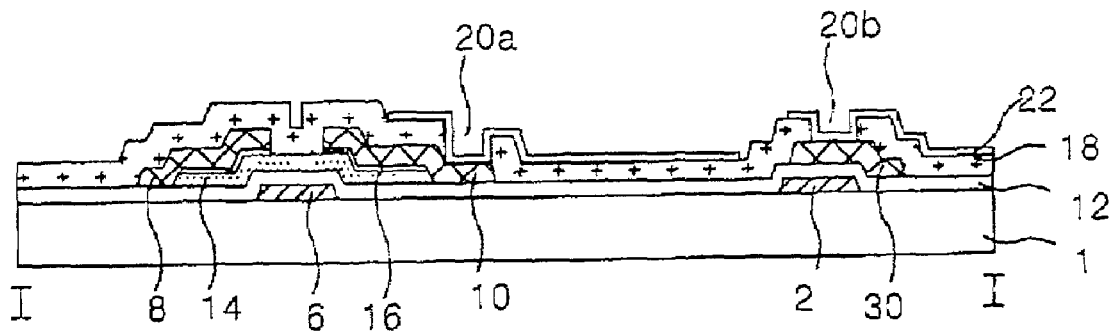
Figure 4:
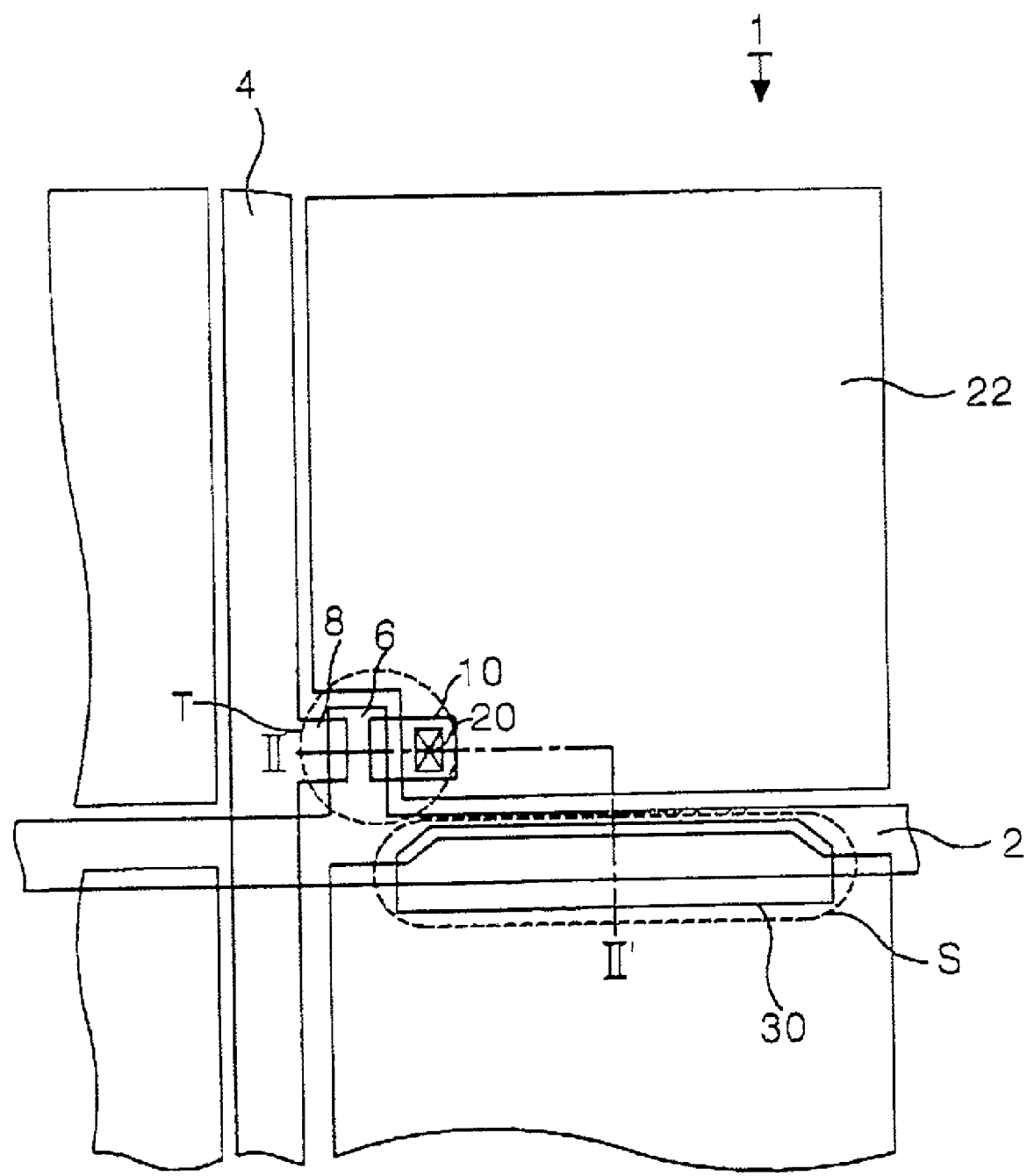
FIG. 4 is a plan view showing a structure of a conventional thin film transistor formed with a half-tone mask.
Figure 5:
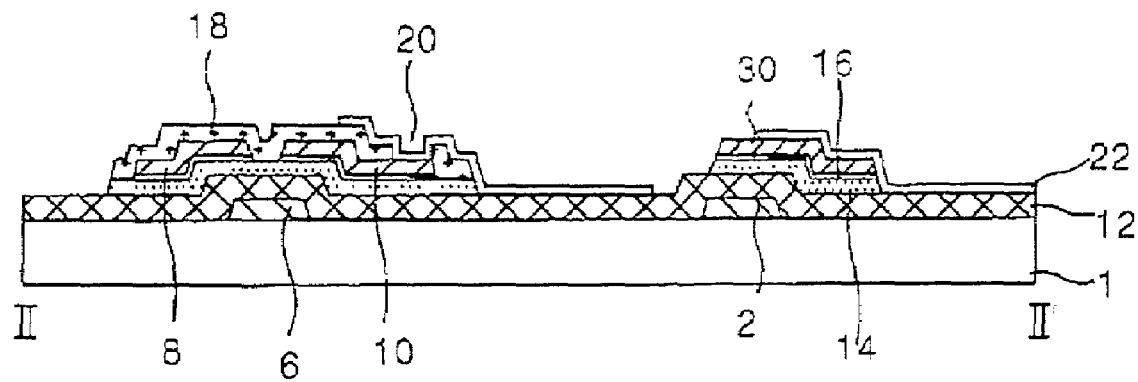
FIG. 5 is a section view of the liquid crystal display device taken along the II-II' line in FIG. 4.
Figure 6A:
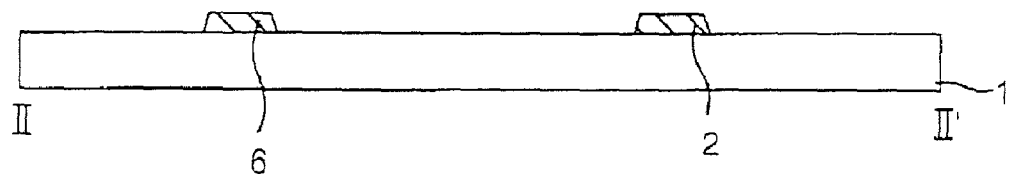
FIG. 6A to FIG. 6F are section views representing step by step a method of fabricating the liquid crystal display device shown in FIG. 5.
Figure 6B:
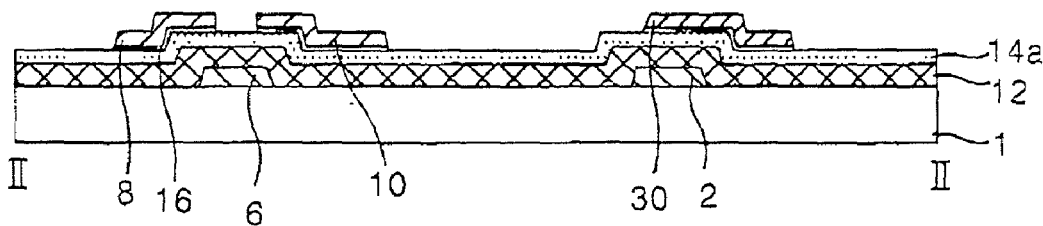
Figure 6C:
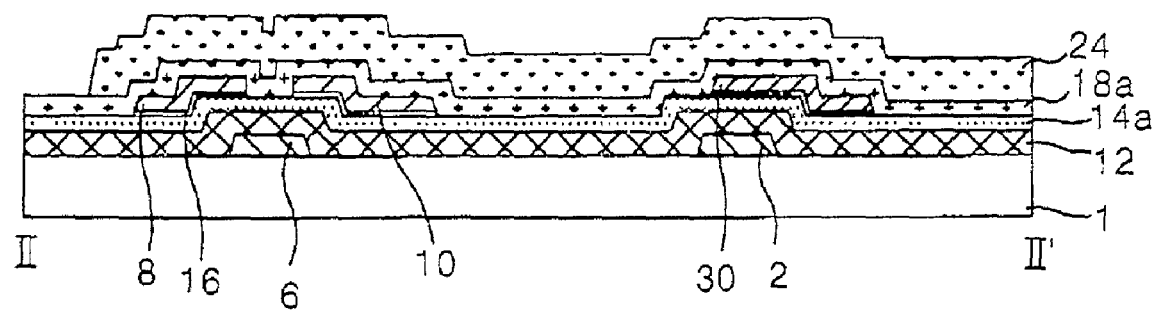
Figure 6D:
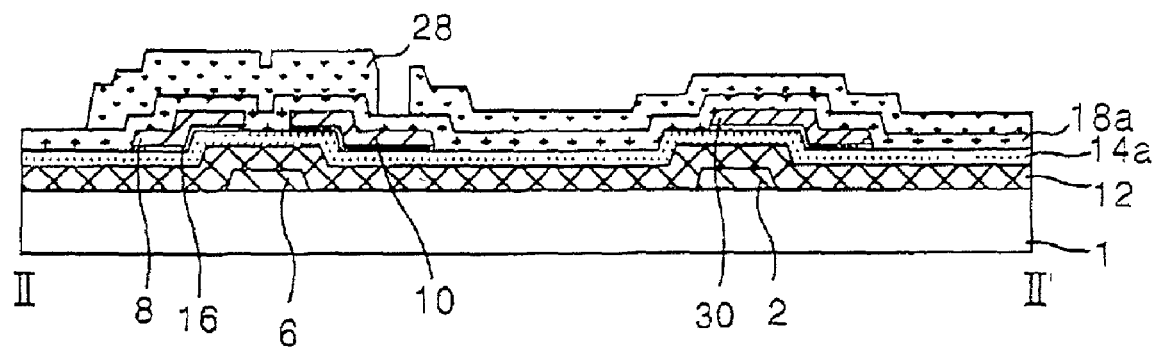
Figure 6E:
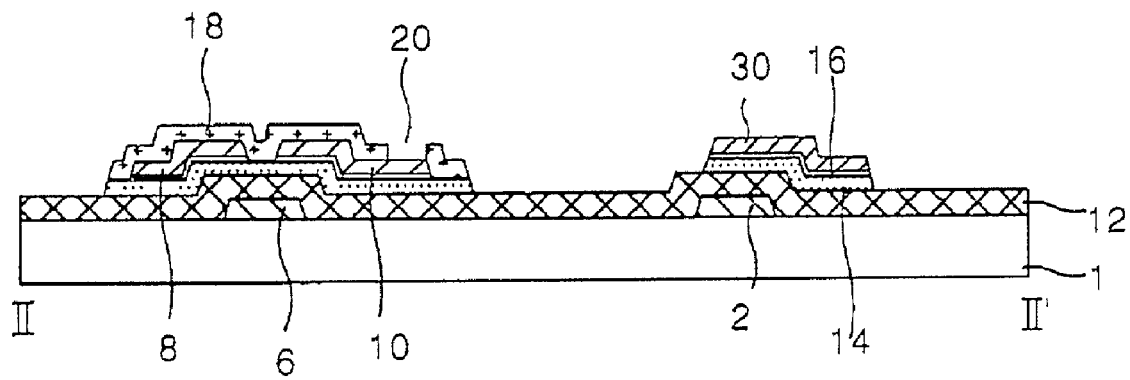
Figure 6F:
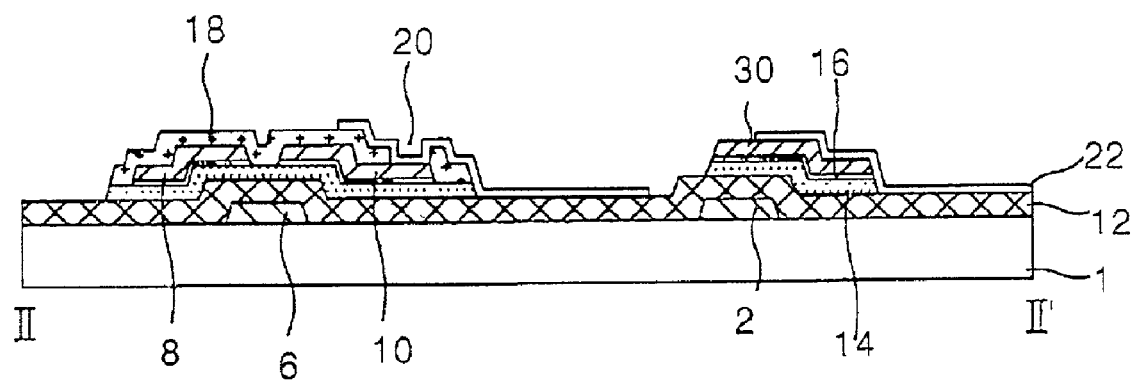
Figure 7:
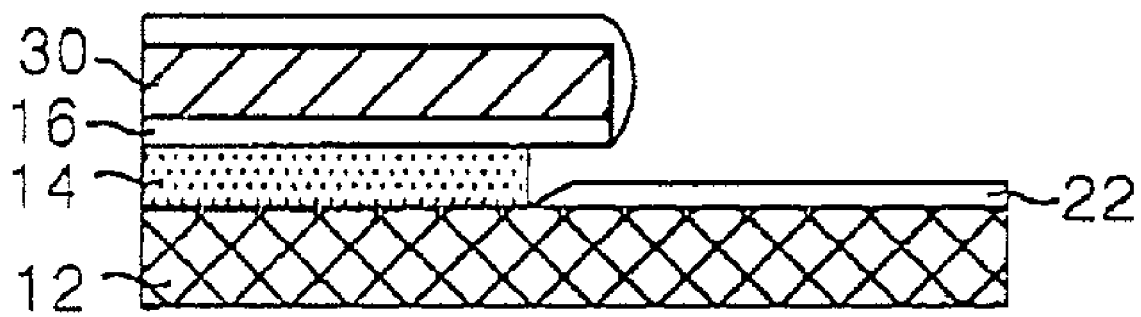
FIG. 7 is a section view of the undercut active layer of the liquid crystal display device shown in FIG. 5.
Figure 8A:
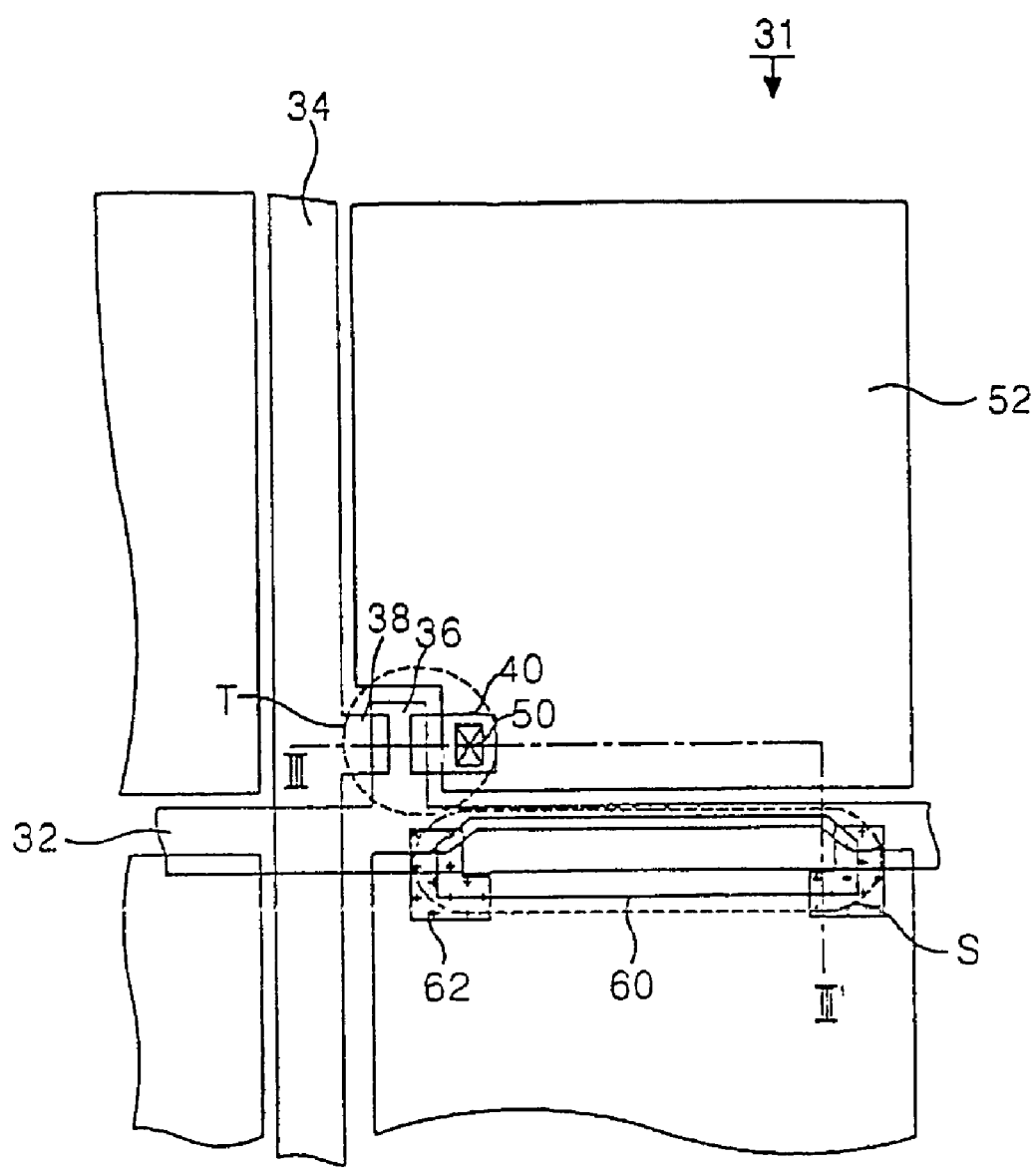
FIG. 8A to 8D are plan views showing a structure of a liquid crystal display device according to a first embodiment of the present invention.
Figure 8B:
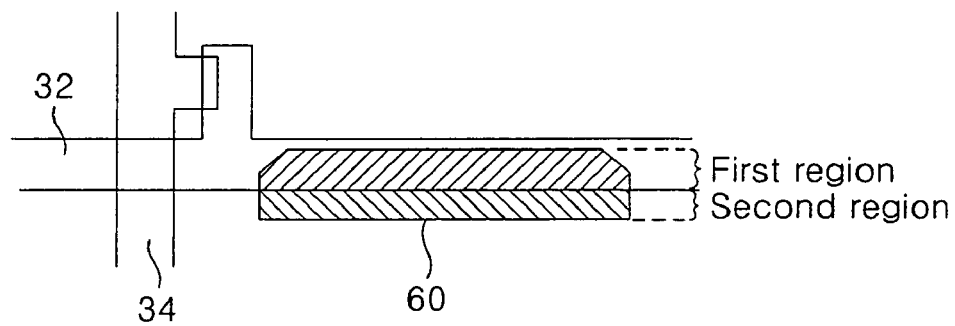
Figure 8C:
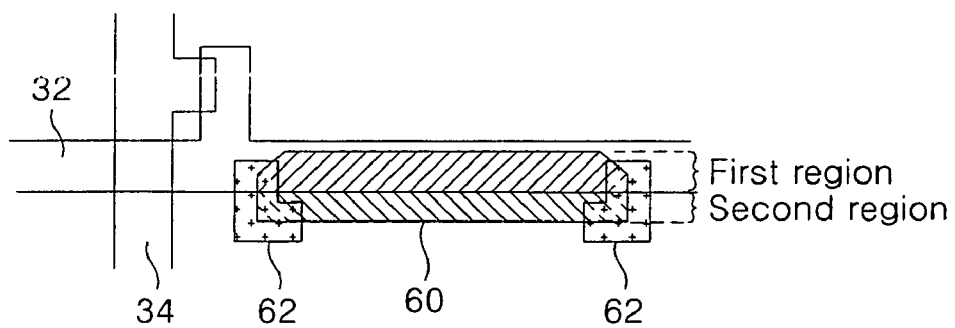
Figure 8D:
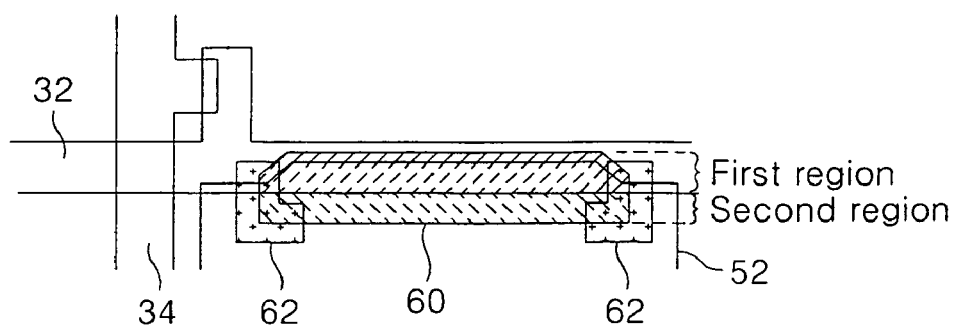
Figure 9:
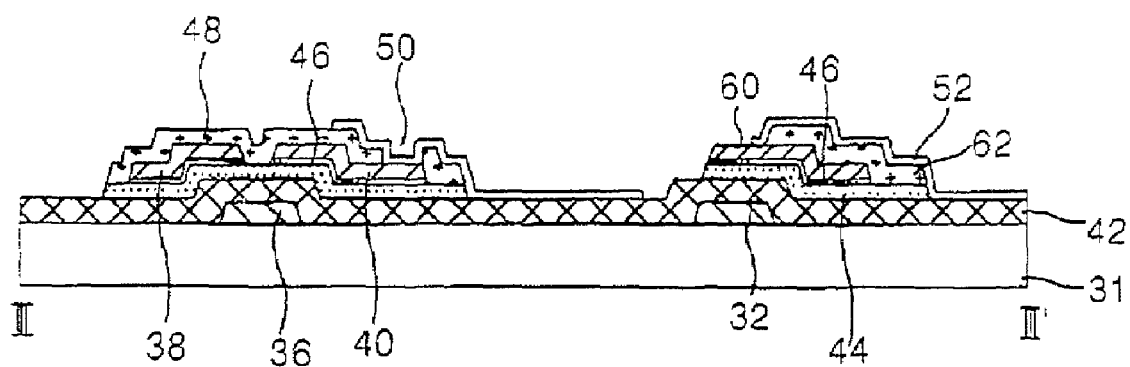
FIG. 9 is a section view of the liquid crystal display device taken along the III–III' line in FIG. 8.

Referring to FIG. 8 and FIG. 9, there is shown a lower substrate 31 of a liquid crystal display (LCD) according to a first embodiment of the present invention includes a TFT T arranged at a crossing of a data line 34 and a gate line 32, a pixel electrode 52 connected to a drain electrode 40 of the TFT T, and a storage capacitor S positioned at an overlapping portion between the pixel electrode 52 and the previous gate line 32.

The TFT T includes a gate electrode 36 connected to the gate line 32, a source electrode 38 connected to the data line 34, and a drain electrode 40 connected to the pixel electrode 52 via a contact hole 50. Further, the TFT T includes semiconductor layers 44 and 46 for defining a channel between the source electrode 38 and the drain electrode 40 by a gate voltage applied to the gate electrode 36. Such a TFT responds to a gate signal from the gate line 32 to selectively apply a data signal from the data line 34 to the pixel electrode 52.

The pixel electrode 52 is positioned at a cell area defined by the data line 34 and the gate line 32. The pixel electrode 52 is made from a transparent conductive material having a high light transmissivity. The pixel electrode 52 generates a potential difference between a common transparent electrode (not shown) provided at an upper substrate (not shown) and a data signal applied via the contact hole 50. By this potential difference, a liquid crystal positioned between the lower substrate and the upper substrate is rotated due to its dielectric anisotropy. Thus, the liquid crystal allows a light applied, via the pixel electrode 52, from a light source to be transmitted into the upper substrate.

The storage capacitor S charges a voltage during application of a gate high voltage to the previous gate line 32 and discharges the charged voltage during application of a data signal to the pixel electrode 52, to thereby prevent a voltage variation in the pixel electrode 52. The storage capacitor S consists of a previous gate line 32 and a storage electrode 60 overlapping with the gate line 32 with a gate insulating film 42 therebetween. The storage electrode is electrically connected to the pixel electrode 52. A protective layer pattern 62 is provided at the edge of said overlapping area between the storage electrode 60 and the pixel electrode 52.

The lower substrate 31 of the LCD requires four masks for patterning each layer. The gate electrode 36 is patterned with a first mask, while an ohmic contact layer 46, the storage electrode 60 and the source and drain electrodes 38 and 40 are patterned with a second mask. The active layer 44, the contact hole 50, the protective layer pattern 62 and the protective layer 48 are patterned with a third mask, while the pixel electrode 52 is patterned with a fourth mask.

FIG. 10A to FIG. 10F are section views and plan views for explaining a method of fabricating the LCD device shown in FIG. 8 step by step along line III–III'.

Figure 10A:
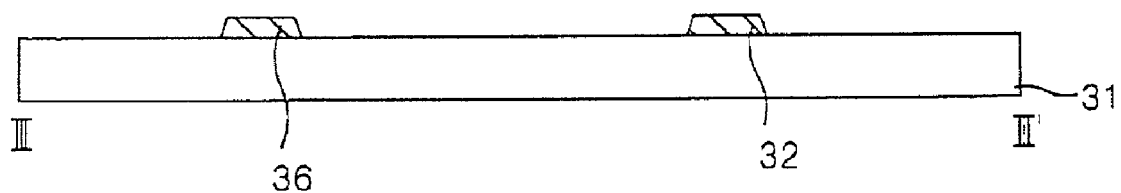
FIG. 10A to FIG. 10F are section views representing step by step a method of fabricating the liquid crystal display device shown in FIG. 9.

Referring first to FIG. 10A, the gate line 32 and the gate electrode 36 are provided on the substrate 31. The gate line 32 and the gate electrode 36 are formed by depositing aluminum (Al) or copper (Cu) by a deposition technique such as a sputtering, etc. and then patterning it with the first mask.

Figure 10B:
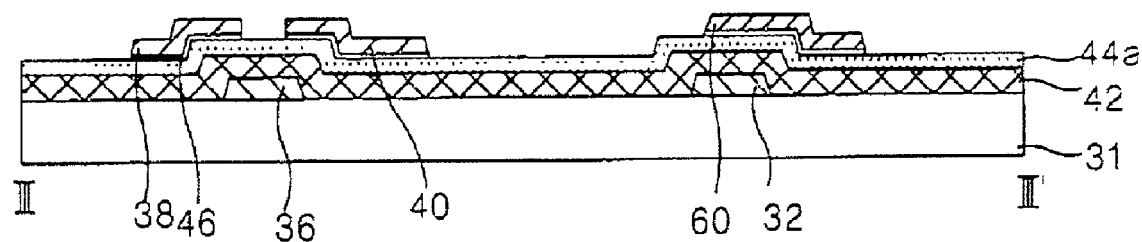

Referring to FIG. 10B, the gate insulating film 42, the ohmic contact layer 46, the storage electrode 60, the source electrode 38 and the drain electrode 40 are provided on the substrate 31. The gate insulating film 42 is formed by entirely depositing an insulating material on the substrate 31 in such a manner to cover the gate electrode 36 and the gate line 32.

The storage electrode 60 and the source and drain electrodes 38 and 40 are formed by entirely depositing a first semiconductor layer 44a, a second semiconductor layer and a metal layer on the gate insulating film 42 and then patterning the second semiconductor layer and the metal layer using the second mask. After the storage electrode 60 and the source and drain electrodes 38 and 40 are patterned, the ohmic contact layer 46 at an area corresponding to the gate electrode 36 and the gate line 32 is also patterned to expose the first semiconductor layer 44a. A portion of the first semiconductor layer 44a corresponding to the gate electrode 36 between the source and drain electrodes 38 and 40 at the first semiconductor layer 44a makes a channel.

The gate insulating film 42 is formed by depositing an insulating material such as silicon nitride ($SiN_x$) or silicon oxide ($SiO_x$) by the plasma enhanced chemical vapor deposition (PECVD) or other method. The first semiconductor layer 44a is formed from amorphous silicon that is not doped with an impurity. On the other hand, the ohmic contact layer 46 is formed from amorphous silicon doped with an n-type or p-type impurity at a high concentration. The storage electrode 60 and the source and drain electrodes 38 and 40 are formed from chrome (Cr) or molybdenum (Mo) or the like.

Figure 10C:
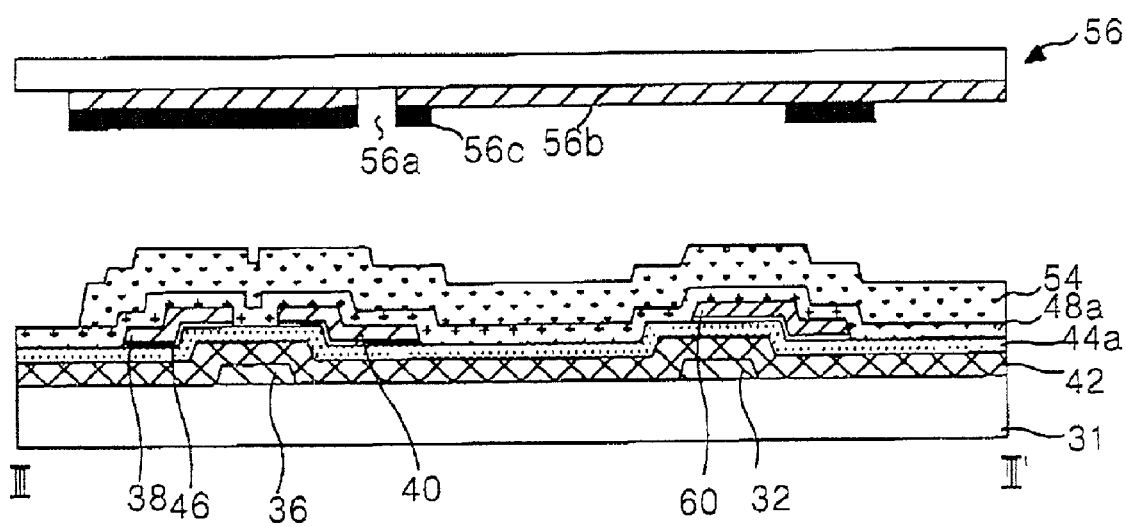

Referring to FIG. 10C, an insulating material 48a and a photoresist 54 are provided on the gate insulating film 42.

The third mask is a half-tone mask 56 having a transmissive part 56a, a semi-transmissive part 56b and a shielding part 56c positioned over the photoresist 54. The shielding part 56c of the half-tone mask 56 is defined at an area later to be provided with the protective film of the TFT and a protective layer pattern at the storage capacitor area. The transmissive part 56a is defined at an area later to be provided with the contact hole of the TFT. The semi-transmissive part 56b is defined at the remaining area. The half-tone mask 56 selectively irradiates ultraviolet light to the photoresist 54 to expose it to the light.

The insulating material 48a is made from an inorganic insulating material such as silicon nitride ($SiN_x$) or silicon oxide ($SiO_x$), an acrylic organic compound, or an organic insulating material having a small dielectric constant such as Teflon, BCB (benzocyclobutene), Cytop or PFCB (perfluorocyclobutane).

Figure 10D:
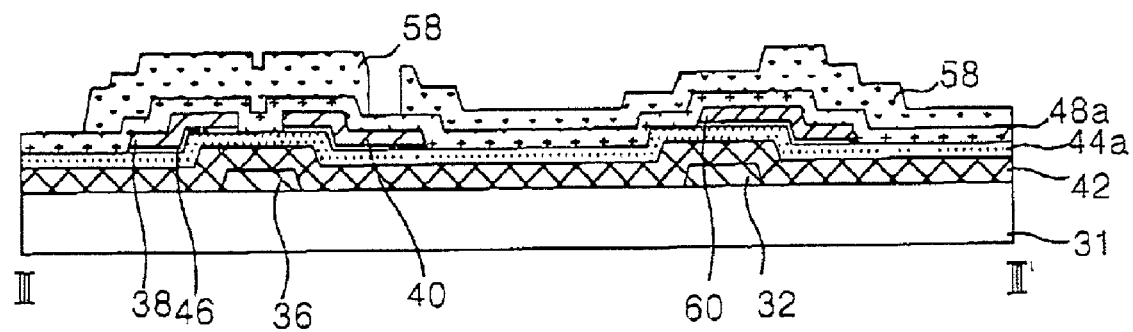

Referring to FIG. 10D, a photoresist pattern 58 is formed on the insulating material 48a. The photoresist pattern 58 is formed by developing the photoresist 54 with a developer such as alkali aqueous solution.

The photoresist pattern 58 having a thickness corresponding to approximately 10 to 50% of the initial coating thickness is formed at an area corresponding to the semi-transmissive part 56b of the half-tone mask 56. The photoresist pattern 58 having the initial coating thickness is formed at an area corresponding to the shielding part 56c; and the photoresist pattern 58 is removed at an area corresponding to the transmission part 56a to thereby expose the insulating material 48a.

Figure 10E:
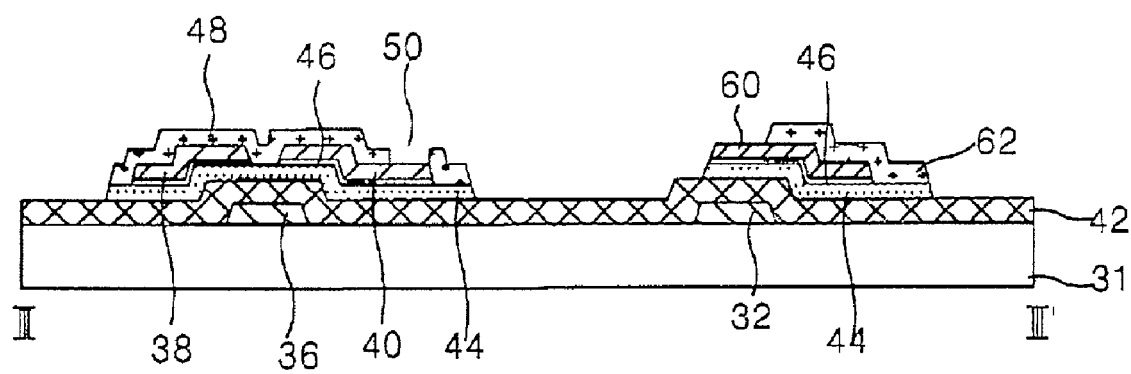

Referring to FIG. 10E, the active layer 44, the protective layer pattern 62 at the storage capacitor area S, the protective layer 48 of the TFT T and the contact hole 50 are provided on the gate insulating layer 42. The active layer 44, the protective layer pattern 62, the protective layer 48 and the contact hole 50 are formed by exposing the substrate 31 provided with the photoresist pattern 58 to an etchant and then simultaneously etching the insulating material 48a and the first semiconductor layer 44a. After the active layer 44, the protective layer pattern 62, the protective layer 48 and the contact hole 50 are formed, the photoresist pattern 58 is removed.

Figure 10F:
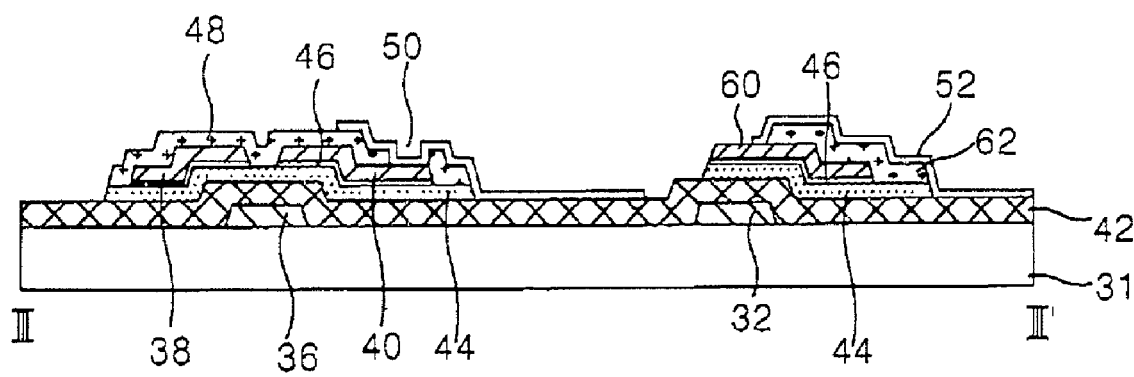

Referring to FIG. 10F, the pixel electrode 52 is provided on the protective layer 48. The pixel electrode 52 is formed by depositing a transparent conductive material such as indium-tin-oxide (ITO), indium-zinc-oxide (IZO) or indium-tin-zinc-oxide (ITZO) on the protective layer 48 and then patterning it using the fourth mask. The pixel electrode 52 directly contacts the storage electrode 60 without any contact hole and electrically connected to the drain electrode 40 via the contact hole 50.

As described above, the protective layer pattern 62 is provided on the edges of the storage electrode 60. Because the protective layer pattern 62 and the active layer 44 has a similar etching selectivity, the end portions of the protective layer pattern 62 and active layer 44 has a smooth slope. Accordingly, a step coverage of a transparent conductive material is improved on the protective layer pattern 62 and active layer 44, so that it becomes possible to prevent breakage of the pixel electrode 52.

Figure 11:
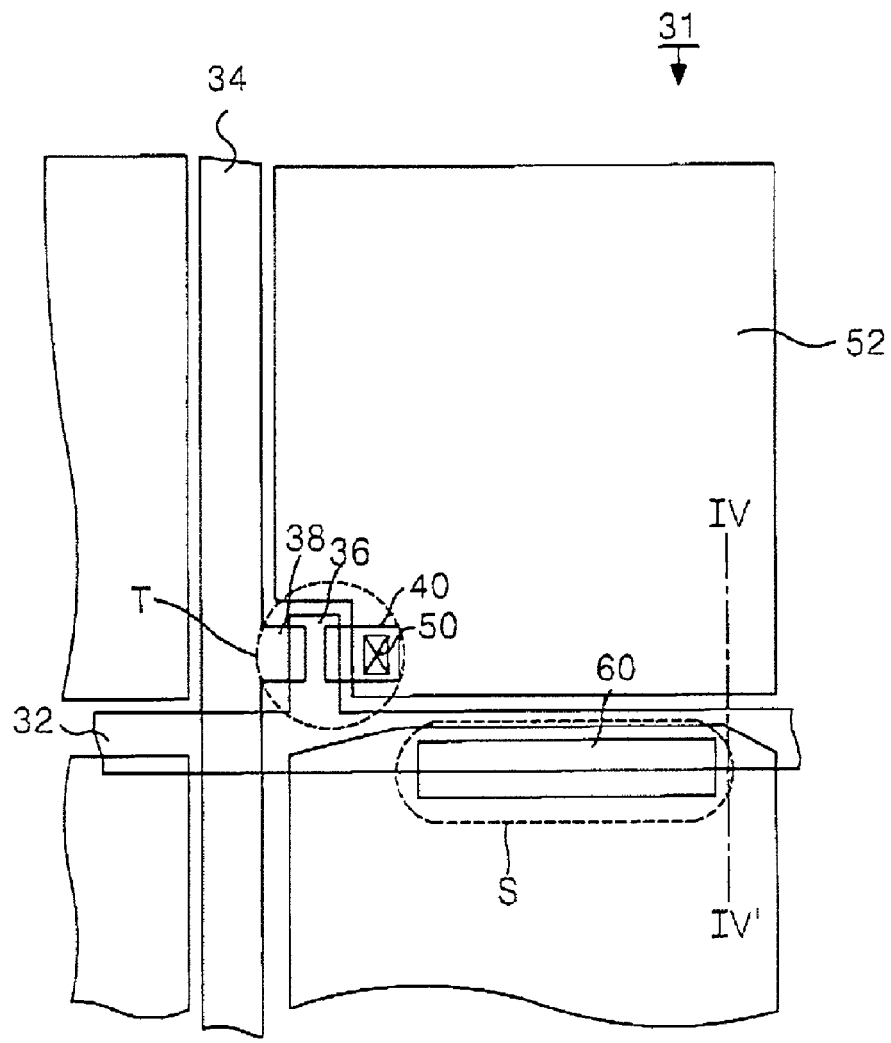
FIG. 11 is a plan view showing a structure of a liquid crystal display device according to a second embodiment of the present invention.
Figure 12:
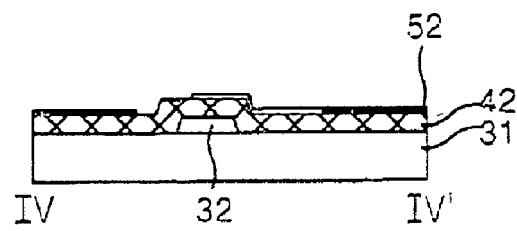
FIG. 12 is a section view of the liquid crystal display device taken along the IV–IV' line in FIG. 11.

Referring to FIG. 11 and FIG. 12, a lower substrate of a liquid crystal display device according to a second embodiment of the present invention has the same elements as the liquid crystal display device shown in FIG. 8, except that a pixel electrode 52 takes a substantially rounded shape of surrounding a storage electrode 60. FIG. 12 is a cross-sectional view of FIG. 11 taken along line IV–IV'.

The pixel electrode 52 is formed in the pixel area and extends into each edge of all sides of the storage electrode 60 in addition to the area of the storage electrode 60, as shown in FIG. 11. Consequently, the lower portion of the pixel electrode 52 is not provided with the active layer (not shown) and the storage electrode 60. Thus, the pixel electrode 52 is uniformly deposited onto the gate insulating film 42. A storage capacitor is formed with the storage electrode 60 and the gate line 32 having the gate insulating film 42 in between them.

Hereinafter, a method of fabricating the lower substrate of the LCD device having the structure as mentioned above will be briefly described.

A gate metal layer is deposited onto the substrate 31 and then patterned to form the gate line 32 and the gate electrode 36, and thereafter the gate insulating film 42 is entirely coated thereon. The first semiconductor layer, the second semiconductor layer and the metal layer are entirely coated on the gate insulating film 42, and then the second semiconductor layer and the metal layer are patterned, to thereby form the ohmic contact layer (not shown), the storage electrode 60 and the source and drain electrodes 38 and 40. Subsequently, the insulating material is entirely deposited onto the first semiconductor layer and then the insulating material and the first semiconductor layer are patterned, to thereby form the contact hole 50, the active layer (not shown) and the protective film (not shown). A transparent electrode material is deposited onto the protective film (not shown) and then patterned, to thereby form the pixel electrode 52.

As described above, according to the first embodiment of the present invention, the protective layer pattern 62 is provided on the edges of the storage electrode 60. Because the protective layer pattern 62 and the active layer 44 has a similar etching selectivity, the end portions of the protective layer pattern 62 and active layer 44 has a smooth slope. Accordingly, a step coverage of a transparent conductive material is improved on the protective layer pattern 62 and active layer 44, so that it becomes possible to prevent breakage of the pixel electrode 52.

Furthermore, according to the second embodiment of the present invention, the pixel electrode is formed to cover entirely the surface and all side edges of the storage electrode, so that it also becomes possible to prevent breakage of the pixel electrode.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device including a data line supplied with a data signal, a gate line supplied with a scanning signal, a pixel electrode for driving a liquid crystal cell, and a thin film transistor for responding to the scanning signal to switch the data signal to the pixel electrode, the device comprising:
    a storage electrode having a first region overlapping the gate line to form a storage capacitor, a second region offset from and parallel to the gate line, and a third region at respective ends of the storage electrode;
    a first protective layer having non-contiguous portions at the respective ends of the storage electrode in a layer between the storage electrode and the pixel electrode, wherein the storage electrode is directly connected to the pixel electrode on an entire upper surface of the second region of the storage electrode; and
    a second protective layer formed between a gate insulating film and the pixel electrode.

2. The liquid crystal display device according to claim 1, wherein said storage capacitor includes:
    the gate insulating film on a substrate in such a manner to cover the gate line; and
    a first semiconductor layer between the gate insulating film and the storage electrode.

3. The liquid crystal display device according to claim 1, wherein the first protective layer is formed at side edges of the storage electrode.

4. The liquid crystal display device according to claim 2, further comprising:
    a gate electrode contacting the gate line on the substrate;
    a second semiconductor layer on the gate insulating film over the gate electrode; and
    a source electrode and a drain electrode on the second semiconductor layer.

5. The liquid crystal display device according to claim 4, wherein the second semiconductor layer includes an active layer and an ohmic contact layer, and the active layer is patterned simultaneously with the second protective layer and the ohmic contact layer is patterned simultaneously with the source electrode and the drain electrode.

6. A liquid crystal display device including a data line supplied with a data signal, a gate line supplied with a scanning signal, a pixel electrode for driving a liquid crystal cell, and a thin film transistor for responding to the scanning signal to switch the data signal to the pixel electrode, the device comprising:
    a storage electrode having a first region overlapping the gate line to form a storage capacitor, a second region offset from and parallel to the gate line; and
    the pixel electrode completely covering an upper surface and side edges of the storage electrode, wherein the storage electrode is directly connected to the pixel electrode on an entire upper surface of the second region of the storage electrode.

7. The liquid crystal display device according to claim 6, wherein the storage capacitor includes:
    the gate line formed on a substrate;
    a gate insulating film formed on the substrate to cover the gate line; and
    a first semiconductor layer formed on the gate insulating film and simultaneously patterned with the storage electrode.

8. The liquid crystal display device according to claim 6, further comprising:
    a gate electrode connected with said gate line on said substrate;
    a gate insulating film on said substrate;
    a second semiconductor layer on said gate insulating film;
    a source electrode and a drain electrode on said second semiconductor layer;
    a protective layer on said gate insulating film; and
    the pixel electrode on said protective layer.

9. The liquid crystal display device according to claim 8, wherein the second semiconductor layer includes an active layer and an ohmic contact layer, the active layer being patterned simultaneously with the protective layer and the ohmic contact layer being patterned simultaneously with the source electrode and the drain electrode.

10. A liquid crystal display device, comprising: first and second substrates;
    a gate line and a data line over the first substrate, the data line crossing the gate line to define a pixel region;
    a thin film transistor having source and drain electrodes at the crossing of the gate line and data line;
    a storage electrode having a first region over the gate line, a second region offset from and parallel to the gate line, and a third region at respective ends of the storage electrode;
    a pixel electrode over the storage electrode;
    a first protective layer having non-contiguous portions at the respective ends of the storage electrode in a layer between the storage electrode and the pixel electrode, wherein the pixel electrode directly connects to the storage electrode on an entire upper surface of the second region;
    a second protective layer formed between a gate insulation film and the pixel electrode; and
    a liquid crystal layer between the first and second substrates.

11. The liquid crystal display device of claim 10, wherein the pixel electrode surrounds an area over the storage electrode.

12. The liquid crystal display device of claim 10, wherein a storage capacitor is formed between the storage electrode and the gate line and wherein the first protective layer overlaps a portion of the storage capacitor.

13. The liquid crystal display device of claim 10, wherein a storage capacitor is formed between the storage electrode and the gate line and wherein the first protective layer overlaps a lower edge of the storage capacitor.

14. The liquid crystal display device of claim 11, wherein the pixel electrode is substantially rounded where the pixel electrode surrounds an area over the storage electrode.

15. The liquid crystal display device according to claim 1, wherein the first protective layer is simultaneously formed with the second protective layer.

16. The liquid crystal display device according to claim 2, wherein the semiconductor layer has an active layer and an ohmic contact layer, and the active layer is patterned simultaneously with the first protective layer and the ohmic contact layer is patterned simultaneously with the storage electrode.

17. The liquid crystal display device of claim 10, wherein the first protective layer is simultaneously formed with the second protective layer.

* * * * *